Figure 1:
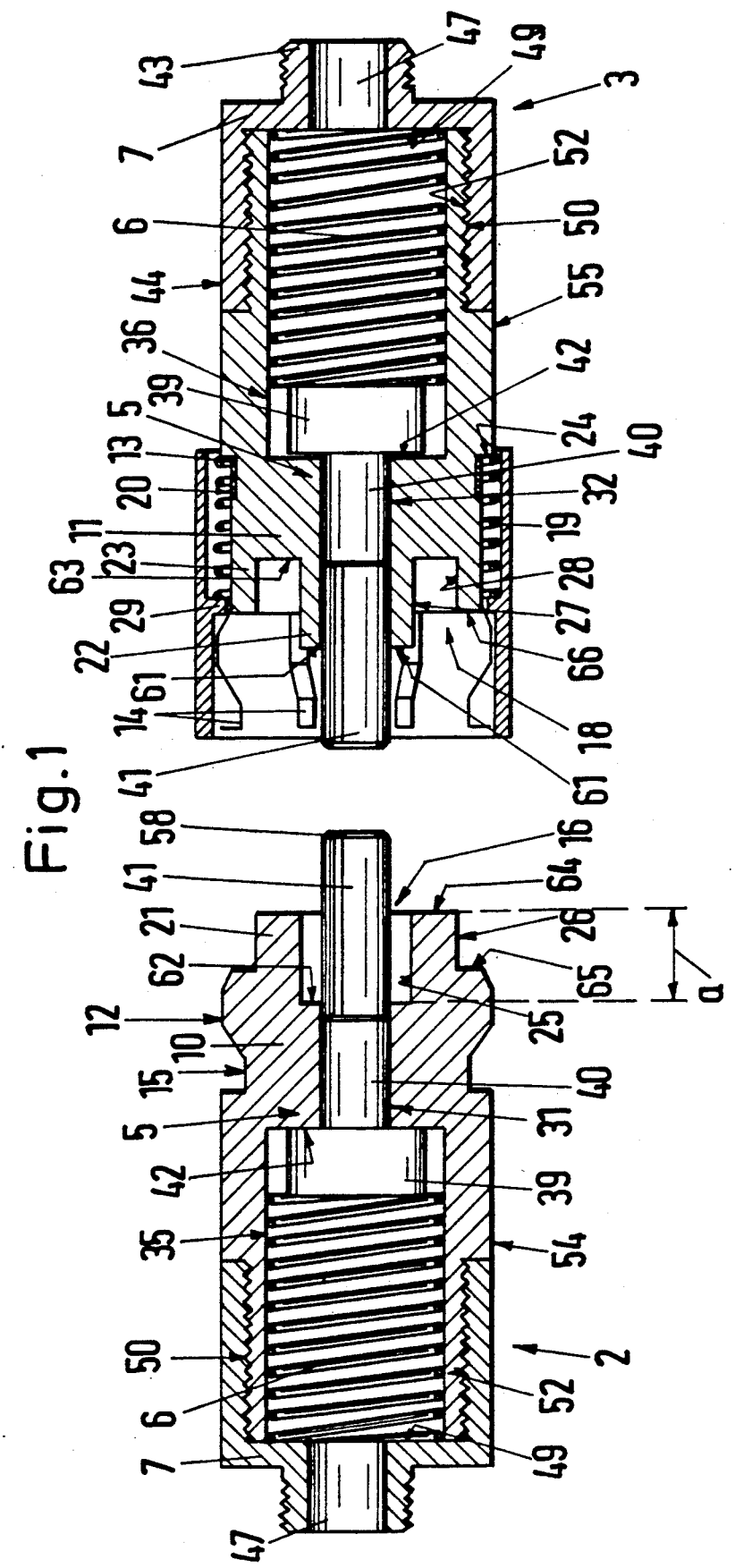

United States Patent [19]
Jaggi

[11] Patent Number: 5,027,855
[45] Date of Patent: Jul. 2, 1991

[54] COUPLING, IN PARTICULAR A QUICK-ACTING COUPLING FOR FLUID CONDUITS

[76] Inventor: Claude Jaggi, Bürenstrasse 91, 2500 Biel, Switzerland

[21] Appl. No.: 423,461
[22] PCT Filed: Feb. 22, 1989
[86] PCT No.: PCT/CH89/00034
§ 371 Date: Sep. 27, 1989
§ 102(e) Date: Sep. 27, 1989
[87] PCT Pub. No.: WO89/07730
PCT Pub. Date: Aug. 24, 1989

[30] Foreign Application Priority Data

Feb. 22, 1988 [CH] Switzerland .................. 644/88
Jul. 26, 1988 [CH] Switzerland .................. 2841/88

[51] Int. Cl.⁵ ............................. F16L 37/28
[52] U.S. Cl. ................................ 137/614.04
[58] Field of Search ........ 137/614.04; 251/149.6

[56] References Cited

U.S. PATENT DOCUMENTS 2,915,325 12/1959 Foster ..................... 251/149.7
3,234,965 2/1966 Anderson ............... 137/614.04

FOREIGN PATENT DOCUMENTS 1272472 10/1961 France ................. 137/614.04
343726 2/1960 Switzerland ........ 137/614.04

Primary Examiner—A. Michael Chambers
Attorney, Agent, or Firm—Brady, O'Boyle & Gates

[57] ABSTRACT

The coupling, preferably designed as a quick-acting coupling, has two sealing members (2, 3) in which the sealing surfaces are of a material having the same coefficient of thermal expansion, in particular a hard metal and having an exact clearance fit exactly inside each other without taper or pressure. There is thus no need for sealing rings, with the result that the coupling is maintenance and trouble-free and can be used for aggressive fluids as well as over a wide temperature range.

15 Claims, 3 Drawing Sheets

COUPLING, IN PARTICULAR A QUICK-ACTING COUPLING FOR FLUID CONDUITS

The invention relates to a coupling, in particular a quick-acting coupling for fluid conduits according to the classifying part of claim 1.

Couplings of this type are used in particular to effect the rapid, tight connection of hoses or other flexible fluid conduits.

A coupling of this type is described in Swiss Patent No. CH-A-626 696. This has two sealing members one of which is designed as a spigot valve and the other as a socket valve, each having a coupling section that may be brought by means of a spring into the closed position which presses in each case against a seal ring in a sealing position on an inner conical surface of the sealing member. The seal between the two sealing members is achieved by a further seal ring of resilient material pressed together by the sealing members. In the coupled state, the coupling section can be locked in the release position by means of a locking pin so that, for example, there can be no axial movements beyond its release position in the event of pressure surges. This is intended, in the most unfavourable circumstances, to prevent the valve from shutting down, thereby completely blocking the entire system. The two sealing members are locked together by means of locking balls, which, in the coupled position, each lie in a groove of a sleeve and of the spigot valve. The presence of additional grooves in a sleeve which can be slipped over the connecting part of the spigot and socket valve makes it possible to bring the balls into a non locking position, it being necessary to displace the locking balls when coupling up and uncoupling, a process which could cause problems, for example as a result of soiling or jamming.

Sealing rings wear out relatively rapidly and the resultant leakage causes damage which can only be prevented by frequent, regular maintenance (replacement of the sealing rings). To change the sealing rings the entire coupling has to be dismantled, which is laborious and time-consuming and necessitates lengthy closing down of the plant in question. Resilient sealing rings cannot be used for aggressive fluids or gases, at high, low or widely fluctuating temperatures or where radioactive radiation is present. It has hitherto been impossible to use any couplings of this nature in such situations. A further disadvantage of conventional couplings of this type is their large number of components, rendering them unreliable and expensive.

Further couplings of this type are describe in French Patent No. FR-A-1 288 938 and Swiss Patent no. CH-A-474 010. These have sealing, conical surfaces against which a resilient sealing lip is pressed. Frequent opening and closing of the sealing members causes wear on the resilient lip and/or the conical surface, impairing the tightness of the entire coupling. If these couplings are only infrequently opened, the sealing lip pressed thereto tends to adhere to the opposing surface so that it is generally impossible to release the coupling without damaging it. Moreover, dirt can be pressed between the conical surfaces when the two sealing members are pressed together, also rendering adequate tightness impossible.

It is an object of the invention to provide a maintenance-free coupling of simple design which can also be used with aggressive fluids and over a wide temperature range. In particular, the coupling should be capable of functioning at high, low or widely fluctuating temperatures, in the presence of radioactive radiation, severe ambient conditions as well as underwater.

According to the invention this object is achieved in the manner set out in the characterizing part of claim 1;

The advantage of the invention lies substantially in the fact that, contrary to prevailing practice, the tightness of the sealing members is effected without resilient sealing rings, conical sealing surfaces or resilient sealing lips, eliminating the need for maintenance and permitting a construction that is simpler than that of conventional couplings, with fewer components that thus requires fewer handling and processing steps during assembly and manufacture.

Figure 2:
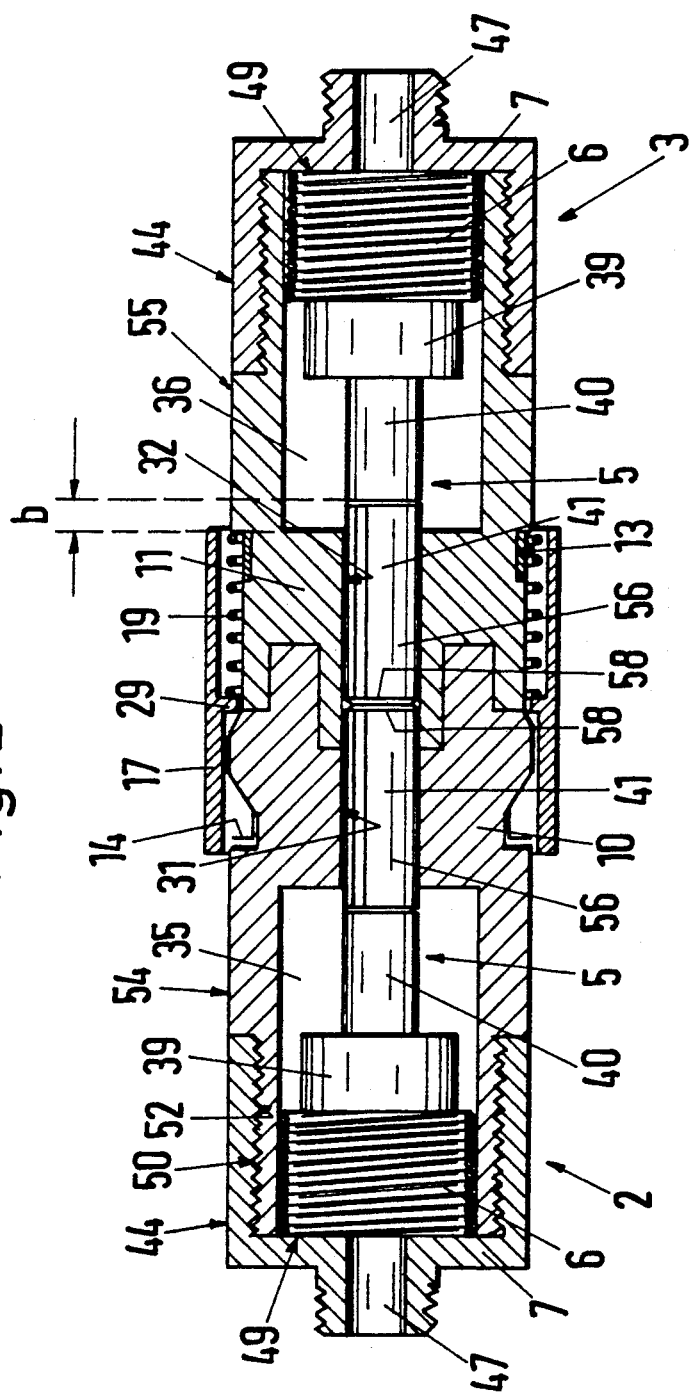
Figure 3:
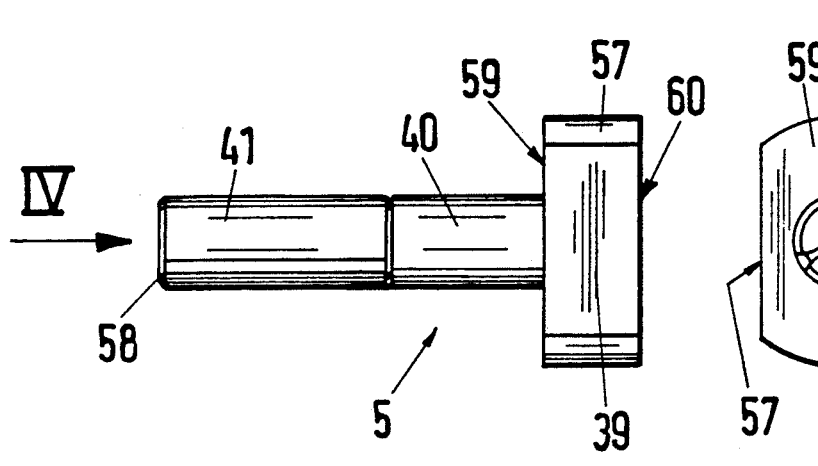
Figure 4:
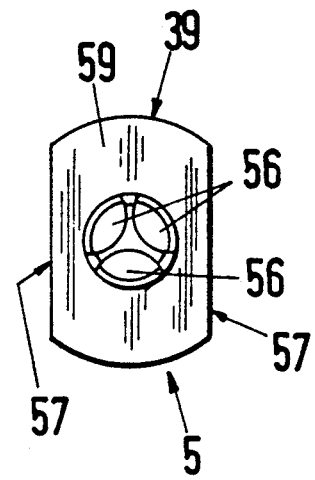
Figure 5:
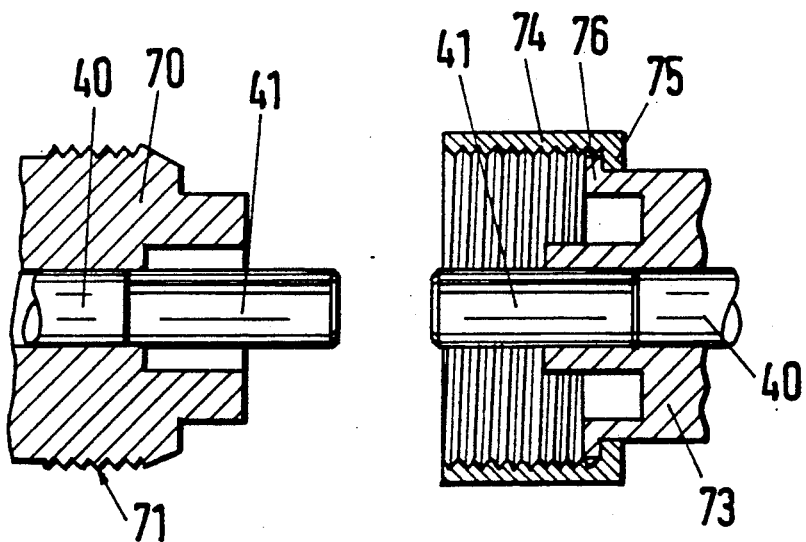

There now follow more detailed descriptions of embodiments of the coupling of the invention with reference to the drawings. There are shown in:

FIG. 1 a longitudinal section through a quick-acting coupling in the uncoupled position, FIG. 2 a longitudinal section through the coupling in coupled position, FIG. 3 a side view of a coupling section of the coupling, FIG. 4 a view of the coupling section along the direction IV shown in FIG. 3, and FIG. 5 a longitudinal section through a variant of the coupling in the uncoupled position.

The quick-acting coupling shown in FIGS. 1 to 4 is used to join flexible conduits through which a fluid such as water or oil flows. It consists of two sealing members 2 and 3, the coupling member 2 being formed as a socket valve and the sealing member 3 as a spigot valve. All components down to the springs 6, 19 described below as well as spring clips 14 and a locking ring 13 are made of the same material in both sealing members 2 and 3, preferably of steel and, in particular, of a corrosion-resistant steel of high degree of hardness; their coefficient of thermal expansion is therefore the same. It is necessary to use materials having the same coefficient of thermal expansion in order, as will be described below, to maintain a clearance fit of the sealing surfaces and hence their clearance gap width without developing into an almost inseparable press fit or a leaking fit in the event of fluctuations in the temperature of the environment or of the fluid. Each of the sealing members 2 and 3 has a coupling section 5 and a helical spring 6 as a sealing spring. The outer diameter of the helical spring 6 is so selected that it is a close tolerance fit in the diameter of a bore 35 or 36 to be described below.

The socket valve 2 has a socket part 10 with an outer coaxial bulge 12 in the vicinity of its front portion 16 directed towards the spigot valve 3 during coupling which, looking along the forward portion 16, follows a groove 15. The spigot valve 3 has a spigot part 11 as well as six spring tongues 14 having hook-shaped notches at their free ends welded onto a slit locking ring 13, said notches extending beyond the forward portion 18 of the spigot part 11 over which a sleeve 17 can be slid by means of a helical spring 19. One closure cap 7 is tightly screwed onto each of the socket part 10 and the spigot part 11.

The slit locking ring 13 is securely held in a coaxial groove 20 of the spigot part 11. The helical spring 19 lies with a clearance fit over the locking ring 13 and a part of the length of the tongues 14. One end of the helical spring 19 abuts against a shoulder 24 of the spigot part 11 as a radial extension of the edge of the groove 20 facing away from the forward portion 18, the other end is supported on an inner, substantially coaxial shoulder 29 of the sleeve 17 about in the middle thereof.

In order to effect coupling, the sleeve 17 is retracted manually against the force of the spring 19, the tongues 14 being resiliently flexible and capable of being pushed over the bulge 12 until they seat in the groove 15. The sleeve 17 is pushed back over the tongues 14 by the force of the spring 19 making it impossible for the tongues 14 to bend radially outwards; both sealing members 2 and 3 are thereby secured in such a way that they cannot slide apart. In the coupled and in the uncoupled position, the shoulder 29, extending from the locking ring 13 rests against a first bend of the tongues 14 looking away from the coupling axis. The sleeve 17 is thus prevented from sliding downwards, but can be pushed over the spring tongues 14 by exerting increased pressure for purposes of assembly and disassembly.

At its forward portion 16 the socket part 10 has a coaxial, annular projection 21, and the spigot part 11 has at its forward portion 18 an inner coaxial annular projection 22 and an outer coaxial annular projection 23, between which a ring groove is formed. The projection 21 has two 25 and 26, circular cylindrical surfaces, the inner projection 22 one 27 and the outer projection 23 one 28. When the sealing members 2 and 3 are connected together, the surfaces 25 and 27 as well as 26 and 28 lie in pairs against each other with clearance fits. Between the two surfaces 25 and 27 there is a maximum gap of 5 $\mu$m; this even renders the coupling helium-tight (if the coupling is used, for example, for water, less stringent demands are made of the maximum gap width). The casing lines of the circular cylindrical casing surfaces 25, 26, 27 and 28 are parallel to the axis of the socket and spigot valve 2 or 3 and thus also parallel to the coupling axis and should have as little taper as possible; taper may only be a maximum of a few angular minutes. This small taper may not be exceeded since otherwise the socket value could jam in the spigot valve when being used as a quick-acting coupling.

The socket part 10 and the spigot part 11 each have a coaxial bore 31 or 32 which, when coupled together, are flush with one another, are aligned with one another and have the same diameter. The edges of the bores 30 and 31 are sharp corners without any burr. The length of the bore 31 corresponds substantially to one and a half times its diameter and is somewhat longer than the casing length of the surface 25 or 27. As described below, the length of the bores 31 and 32 as well as the casing lengths a of the surface 25 or 27 shown in FIG. 1 depend on the finishing tolerances and the desired sealing effect. The bore 31 passes at its end facing the forward portion 16 angularly into a bore with the coaxial inner surface 25, the inner diameter of which is the same as the outer diameter of the annular projections 22 apart from a clearance fit. The bore 32 continues in the annular projection 22. Its total length is substantially the same as the sum of the length of the bore 31 plus the casing length of the surface 25.

The bores 31 and 32 extend respectively beyond a radial step surface 42 perpendicular to the bore hole axis into further bores 35 and 36, the diameters of which are substantially the same; the bore hole axes and the axes of the sealing members are identical. The diameter of these bores 35 and 36 is determined in construction by the diameter of a hat 39 (described below) 39 of the coupling section 5 and the diameter of the helical spring 6 adapted thereto. The lengths of the bores 35 and 36 derive from the length of the fully compressed helical spring 6 plus the thickness of the hat 39 plus the length of a fitting 40 (described below) of the coupling section 5 plus a few millimetres which, as will be described below, are necessary to enable fluid to flow through a port and guide member 41 (described below) of the coupling section 5.

As shown in FIGS. 1 and 2, the closure cap 7 is in one-piece with a coaxial screw nipple 43 connected to a coaxial hexagonal nut 44. In the centre of the screw nipple 43 is a bore 47 which extends in a radial wall 49 perpendicular to the axis of the bore hole into an axial internal thread 50 inside the hexagonal nut 44. The closure cap 7 is screwed as described above to the socket 10 and spigot part 11 respectively by means of their inner threads 50 by means of an external thread 52 on the portion facing away from the forward portions 16 or 18. In the assembled state, the closure caps 7 sit securely on the socket 10 and spigot part 11. Sealing is achieved by the wall 49 to which the forward portion of the socket 10 and spigot part 11 facing away from the forward portions 16 or 18 is pressed. To make it possible to screw on and subsequently unscrew the closure cap 7 firmly to the socket 10 and spigot part 11 respectively they are shaped in the same way as the circumferential surfaces 54 or 55 of the socket 10 and spigot 11 i.e. in the form of a hexagonal nut 44, as mentioned above.

A flexible conduit or a hose (not shown) is secured to the appropriate sealing member 2 or 3 in each case to one of the screw nipples 43 of the closure cap 7 shown in FIGS. 1 and 2. Instead of a screw nipple 43 it is also possible to provide a hose connection that is retained firmly using a hose clip.

The dish-shaped hat 39, together with a cylindrical bolt serving as the stem, forms the mushroom-shaped coupling section 5. The surfaces of the underside 59 and upper side 60 of the hat are substantially parallel to one another and lie perpendicular to the axis of the stem. Cut out of the dish-shaped hat 39 are two opposing circular segments 57 which serve as the throughflow space for the fluid. In the uncoupled position, the underside 59 of the hat 39 is pressed against the stop surface 42 by means of the helical spring 6. The upper side 60 of the hat 39 supports one end of the helical spring 6. The stem has three semicircular recesses 56 about its circumference along two thirds of its length facing away from the hat 39. The cross sectional surfaces of the two circular segments 57 and the three recesses 56 are substantially identical; the fluid flows therethrough in the coupled state. The fitting 40 is designed as a circular cylinder and is about only one third of the length of the port and guide member 41. These length ratios were selected to enable the fluid to flow into and out of the three recesses 56 at a distance b between the end of the fitting 40 and the surface 42, as may be seen in FIG. 2.

In FIGS. 1 and 2, the coupling sections 5 are rotated about their stem axis by 90 degrees as compared to the representation in FIG. 3 in order to show more clearly the free or blocked path of the fluid inside the coupling.

The port and guide members 41 of the coupling sections 5 lie aligned with one another in the coupled state. The coupling sections 5 are freely rotatable in the bore 31 or 32 and the sealing members 2 and 3 are also freely rotatable during assembly. It is consequently not possible to predict how the crosspieces between the recesses 56 will match up in the coupled state. The port and guide members 41 have on their forward portion a bezel 58. This prevents fluctuations in flow when the recesses 56 are rotated against each other.

In the uncoupled state, as shown in FIG. 1, the fitting 40 of the coupling section 5 is inserted with a clearance fit of preferably at most 5 μm when water is the fluid and steel is the material of the sealing parts with a pressure difference to be retained of a few tens of atmospheres in the bores 31 and 32 respectively. The size of this gap varies according to the pressure difference of the fluid to be contained, the viscosity of the fluid, the length of the fitting 40 and the utilizable spring force of the helical spring 6. As in the case of the surfaces 25 to 28, the taper of the fitting 40 and the bores 31 and 32 may not exceed a few angular minutes.

The gap is on the one hand wide enough to allow the easy sliding of the coupling section 5 and, on the other hand, narrow enough to ensure adequate sealing to the outside of the fluid in the bore 36. The coupling section 5 must be pushed forward during uncoupling by means of the sealing spring 6 as fast as the two sealing members 2 and 3 are pulled apart. This would be possible at any time with a sufficiently large spring force, but the spring force may, however, only be large enough to enable the two coupling sections 5 to be pushed together with a normal force of a few Newtons, as achieved without effort by pushing both hands against each other.

In the above described example the clearance fits providing the seal are so designed that they are a maximum of five micrometres in the case of a single sealing pair of surfaces, as between the fitting bore 31 or 32 and the corresponding fitting 40. In the event of several radial, intricately arranged sealing surfaces, as in the case of the surface pairs 61/62, 25/27, 63/64, 26/28, 65/66 the clearance fit can be up to one tenth of a millimetre.

The sealing effect of the coupling surprisingly achieved without any resilient sealing rings and without sealing surfaces pressed against one another may perhaps be explained as follows: there is a film of fluid in the ring gap between the bore 32 and the fitting 40 which adheres as a result of its adhesive force both to the inner wall of the bore 32 and to the fitting piece 40. The friction of the fitting piece 5 inside the bore 32 is analagous to the friction of a lubricant in a trunnion bearing. It is proportional to the coefficient of viscosity of the sliding surface, the speed with which the coupling section 5 is moved and reciprocal to the gap width. The flow rate through the gap is proportional to the pressure gradient between inner and outer pressure, the cross section surface of the gap, the quadrant of the gap width and reciprocal to the coefficient of viscosity. The coefficient of viscosity depends on the temperature of the fluid and its pressure. In summary, it is to be assumed that the surprising sealing effect is based on the adhesive force and the properties (coefficient of viscosity, . . . ) of physically non-ideal fluids.

To prevent the coupling section 5 jamming as it moves backwards and forwards it must be exactly guided to ensure the high degree of accuracy demanded of it. The exact guidance is achieved by means of accurately fitted surfaces of the crosspieces between the recesses 56.

The surfaces 25 and 27, as well as 26 and 28 seal the flow passing between the two sealing members 2 and 3. As already states, their tolerances are of the order of micrometres. The accuracy of these surfaces may be smaller since the seal is achieved in a radially intricate manner by means of the two gaps between the surfaces 25/27 and 26/28, as well as through an additional gap between two radial surfaces 61 and 62 the bore 32 to the surface 27 and of the bore 31 to the surface 25 and a further gap between two radial surfaces 63 and 64 of the surface 27 to the surface 28 and from the surface 25 to the surface 26, as well as through the surface 65 radially adjacent to the surface 26 or the adjacent surface 66 radial to the surface 28. The sealing effect of these pairs of surfaces 25/27, 26/28, 61/62, 62/63 and 65/66 is further improved since the flow passing therethrough exerts a suction effect on the fluid present in the gaps.

During uncoupling, the sleeve 17 is pushed back by hand and the two sealing members 2 and 3 are pulled apart against the clamping force of the tongues 14 on the bulge 12. The helical spring 6 presses both coupling sections 5 substantially evenly out of the corresponding sealing members 2 and 3. Both port and guide members 41 touch each other at their forward portions, the corresponding fitting 40 is slid into the corresponding fitting bore 31 or 32 and thus seals in the fluid in the conduit system behind the appropriate sealing members. The sealing members are only pulled so far apart that there is no longer any sealing effect of the surface pairs 25/27, 26/28, 63/64, 65/66, 61/62 when about two thirds of the overall length of the fitting 40 is situated about two thirds inside the fitting bore 31 or 32. There is no spurting during uncoupling since sealing is achieved before the sealing surfaces of the coupling have been completely separated from one another. The coupling sections 5 then slide further into the fitting bores 31 and 32, until the undersides 59 of the hats 39 abuts on the surfaces 42.

During manufacture of the components for the two sealing members 2 and 3, care is taken to ensure that the surfaces 26 and 28, as well as in particular 25 and 27 are coaxial to each other and are as free of taper as possible. The taper may not exceed a few angular minutes since a higher value would impair the operability of the coupling and would, in the case of larger pressures, cause jamming when the sealing members are pulled apart. An advantage of these coaxial surfaces is that any dirt adhering to the surfaces 25/27 and 26/28 respectively is pushed aside when the sealing members 2 and 3 are pushed together.

It has been found in practical experiments that the sealing effect is still preserved when the sealing members are pulled apart up to substantially half the casing length of the surface 25 or 27. Sealing is thus achieved by the above described design of the two surfaces 25 and 27.

The situation is analagous for the seal of the coupling section 5, it also being necessary here to avoid any taper in the casing surface of the fitting 40 as well as the axial fitting bore 31 or 32.

Instead of the hat 39 having the above-described shape, it may also have a number of bores, the axes of which run substantially parallel to the axis of the stem or which are, for example, shaped like a small cross. Its function is to serve as a support for one end of the helical spring 6 and to abut in the uncoupled state against the surface 42 so that the helical spring 6 does not push the coupling section 5 out of the corresponding sealing members 2 or 3. Otherwise, the hat 39 would have to be shaped in such a way that the fluid can flow through or alongside it.

Instead of the three recesses 56 is is also possible to use several recesses as well as also differently shaped recesses to those shown. It is only necessary to ensure the guide properties and an adequate throughflow. The form shown has, however, proved to be optimum.

Instead of six spring tongues 14 it is also possible to use three, four, five or more than six tongues. Six tongues nevertheless ensure good guidance when pushed together.

If the coupling does not have to fulfill very high sealing requirements, the sealing surfaces 26 and 28 may be omitted in a simplified construction.

Instead of the spring tongues 14 which prevent the two sealing members together with the spring-loaded sleeve 17 from sliding apart, it is also possible for a sealing member 70 to have a thread 71 and the other sealing member 73 to have a spigot nut 74 fitting thereto, as shown in FIG. 5. The spigot nut 74 has a coaxial shoulder 75 and the sealing member 73 a radial shoulder 76, the diameter of which is larger than the inner diameter of the radial shoulder 76. Before the hose is fitted, the spigot nut 74 is pushed over the corresponding sealing member 73.

Instead of the circular cylindrical shape of the annular projections 21, 22, 23, the sleeve 17 and the arrangement of the tongues 14 it is also possible to select an asymmetrical shape, e.g. a kidney shape. An asymmetrical shape lays down the corresponding position of the sealing members 2 and 3 to each other. In addition, if the radial position of the coupling section 5 to the corresponding sealing member 2 or 3 is established in such a way that the recesses 56 of the two port and guide members 41 align with one another, optimum through-flow is always present in the coupled state. The radial position of the coupling sections 5 can, for example, be fixed in that the hat 39 has grooves or bulges (not shown) about its edge which run in projections or depressions of the bore 35 or 36 (not shown).

If the annular projections 21, 22, 23, the sleeve 17 and the arrangement of the tongues 14 are of different shape, e.g. kidney, triangular or rectangular, differing from the circular cylindrical shape, it is possible to manufacture couplings having non-interchangeable sealing members. This makes it possible to install entire coupling batteries which eliminate the risk of confusing individual sealing members and interchanging the fluid flows. If the sealing surfaces 25/27 and 26/28 are not composed of circular cylindrical surfaces, but of circular cylindrical and flat right angular part surfaces or only of prismatic surfaces, then the casing lines of the annular partial surfaces and/or the partial surfaces or prismatic surfaces lie parallel to the axes of the socket or spigot valves 2 or 3. Instead of using different shapes it is also possible to use different diameters. The couplings can, moreover, be coded by providing matching holes and pins in one or more of the surfaces 61, 63, 66 of the spigot part 3 and one or more of the surfaces 62, 64, 65 of the socket part 2 fitting thereto. It is also possible only to provide threaded holes in the surfaces 61 to 66 for the user to screw pins and grub screws into the appropriate holes flush with the surface in order to produce the coding desired.

If the coupling section 5 and the helical spring 6 are not used for the quick-acting coupling, this coupling may also be used as a simple coupling to join pieces of conduit.

Flow rate may be adjusted through the size of the area of cross section of the recesses 56. In other words, the flow rate can be set by inserting a coupling section with an area of cross section corresponding to the recesses 56.

Instead of the fitting bore 31 or 32 it is also possible to design the bores 35 and 36 as fitting bores. The hat 39 of the coupling section 5 is then axially designed by analogy with the fitting 40 and the port and guide member 41. It is also possible for the bores 31 and 32 or 35 and 36 to be designed in such a way that they assume the fitting and guiding functions. These bores then have axial notches (not shown) on the inner surface of their part facing away from the forward portion 16 or 18 which directs the fluid in the coupled state. The remaining part of the bore is designed as a fitting. If the hat is designed as a fitting, port and guide member, the sealing spring 6 must be designed as a central spring which no longer abuts against the rim of the hat. This solution involves a more complicated construction and it is harder and more laborious to make the exact fits to the large bores 35 and 36 than to the bores 31 or 32.

The coupling section 5 acts as a variable pressure reducer due to its staggered mushroom-shaped design. During uncoupling there is a continuous fall in pressure which prevents excessive surges in the conduit system to be detached.

Due to the particular design of the coupling it is possible to avoid inner threads which would hinder flow. Care has, in particular, been taken to provide the bore 35 or 36 with smooth inner walls.

As already mentioned, a substantial advantage of the coupling or quick-acting coupling of the invention as compared to conventional couplings lies in the elimination of resilient sealing elements which have to be specially exchanged and which wear rapidly, depending on the fluid passing therethrough, on the ambient temperature and conditions.

Instead of being made from the same steel, the sealing surfaces 25/27, 26/28, 31/40, 32/40 and the coupling section 5, the socket and spigot part 10 and 11 may be made from brass or aluminium treated in the same manner, in particular surface-treated. Instead of the same hard metal, the coupling section 5 and the socket and spigot parts 10 and 11 may be composed of hard plastic or may just be plastic-coated.

During coupling, care is taken to obtain a smooth throughflow without gap and corners in which material could become deposited. For this reason the coupling is particularly suitable for the food sector. It may also be used in the chemical industry and in the laboratory.

By means of appropriate design of the front portion surfaces 61 to 66 and 25 to 28 of the socket and spigot valve 2 and 3 it is also possible to pass gaseous fluids through the coupling.

The quick-acting coupling described in claim 6 and in claim 8 may also be made of lightweight metal, for example aluminium. A groove may, for example, be provided for insertion of a sealing ring, preferably in a corner formed of the two surfaces 27 and 63 or 25 and 62. It is also possible for the coupling section 5 to have a groove for a sealing ring, preferably in the corner formed of the underside of the hat 59 and the fitting 40.

I claim:

1. A coupling for fluid conduits, comprising a first and a second coupling member (2, 3), said first coupling member (3) including a first hollow space (36) and said second coupling member (2) including a second hollow space (35) to be connected to the respective fluid conduits, said first and said second hollow space (35) each having a front wall (42), said first coupling member (3) having an annular projection (22) with a cylindrical outer metallic sealing surface (27), said second coupling member (2) having a first bore with a cylindrical metallic sealing surface (25), said cylindrical outer metallic sealing surface (27) of said annular projection (22) fitting in said cylindrical metallic sealing surface (25) of said first bore such that in the coupled state (FIG. 2) the two metallic sealing surfaces (25, 27) tightly adjoin to one another and are separated from one another only by a clearance fit being so small that the fluid cannot escape between the sealing surfaces (25, 27), said first coupling member (3) including a second bore with a cylindrical metallic sealing surface (32) extending axially throughout said annular projection (22) and through said front wall (42) into said first hollow space (36).

said second coupling member (2) including a third bore with a cylindrical sealing surface (31) extending from the rear end of said first bore (25) through said front wall (42) into said second hollow space (35), a first and a second closure bolt (5) for closing the first and second coupling member (3) in the uncoupled state (FIG. 1) and opening them for communication with one another in the coupled state (FIG. 2), said first and second closure bolt (5) having a port and guide front part (41) and a cylindrical sealing back part (40), the first port and guide front part (41) as well as the first sealing back part (40) being designed to slide in the second bore (32) and the second port and guide front part (41) as well as the second sealing back part (40) being designed to slide in the third bore (31), the first and second cylindrical sealing back part (40) each being provided at its rear end with a stop (39), lying in the first and respectively second hollow space (36, 35) and loaded by a spring (6) connected to urge the stop (39) towards the front wall (42) of the first and respectively second hollow space (36, 35), the first and second port and guide front part (41) abutting one another during coupling and thereby being pushed backwards against the forces of said springs (6), so that they are lying in the coupled state (FIG. 2) in the second and respectively third bore (32, 31), the port and guide front part being so designed that on the one hand it slides and is thereby guided in the second and respectively third bore (32, 31) and on the other hand fluid can flow therethrough, the first and the second sealing back part each having a cylindrical outer metallic sealing surface (40) fitting in the cylindrical metallic sealing surface (32, 31) of the second and respectively third bore and lying in the coupled state (FIG. 2) in the first and respectively second hollow space (36, 35) and, in the uncoupled state (FIG. 1), tightly in the second and respectively third bore (32, 31), the metallic sealing surfaces (32, 31, 40) of the sealing back parts and the second and respectively third bore being separated from one another only by a clearance fit being so small that the fluid cannot escape between the sealing surfaces.

2. A coupling according to claim 1, wherein said first and second coupling member (2, 3) provided with said metallic sealing surfaces consist of the same hard metal material, the fluid tight sealing between said annular projection (22) and said first bore (25) and between said sealing back part (40) of said first and second closure bolt (5) and said second and respectively third bore (32, 31) being provided only by their cylindrical metallic sealing surfaces (27, 25, 40, 32, 31) without taper or pressure of the surfaces and without elastic sealing means.

3. A coupling according to claim 1, wherein said second and said third bore have the same diameter and abut against each other and are aligned with one another in a flush manner in the coupled state (FIG. 2), said second coupling member (2) having a second annular projection (21) surrounding said first bore, the inner surface of said second annular projection (21) being said cylindrical metallic sealing surface (25) of said first bore, said first coupling member (3) having an annular groove (27, 63, 28) surrounding said first annular projection (21), said second annular projection (21) gripping in said annular groove (27, 63, 28) in a sealed manner in the coupled state (FIG. 2).

4. A coupling according to claim 3 characterized in that the internal diameter of the annular projection (21) of one sealing member (2) is larger than the diameter of the bore (31), there being an annular step (62) at least substantially perpendicular to the coupling axis between the inner surface (25) of the projection (21) and the bore (31), the bore (32) of the other sealing member (3) passing through its annular projection (22) and about the outer side (27) thereof surrounded by an annular groove (27, 63, 28) adapted to the projection (21) of one sealing member (2), the sealing surfaces being formed by the inner surface (25) of the annular projection (21) of one sealing member (2) and the outer surface (27) of the annular projection (22) of the other sealing member (3) as well as the outer surface (26) of the projection (21) of one sealing member (2) and the corresponding surface (28) of the annular groove (27, 63, 28) of the other sealing member (3), the step (62) and one front surface (61) of the projection (22) as well as a substantially perpendicular annular floor (63) of the annular groove (27, 63, 28) and an annular front surface (64) of the projection (21) serving as stop surfaces for the two sealing members (2, 3).

5. A coupling according to claim 1, characterized in that one sealing member has an external thread (71) and the other sealing member has a matching corresponding spigot nut (74) to prevent the two sealing members from sliding apart.

6. A coupling, according to claim 1, characterized in that one of the two sealing members (2) has an outer coaxial ring (12) and the other member (3) has a plurality of resilient tongues (14) attached to its outer side the free ends of which are bent in the shape of hooks and which in the coupled position extend over the outer ring (12) in order to prevent the coupling from sliding apart.

7. A coupling according to claim 6, characterized in that the other sealing member (3) has a retractable retaining sleeve (17) slidable forward over the tongues (14) by means of a spring (19) and against the force of the spring (19), whereby the sleeve is urged back to release the tongues (14) when effecting coupling and then forced forward over the tongues (14) by means of the spring (19) so that their hook-shaped ends are held down to engage with the ring (12).

8. A quick-acting coupling, preferably according to claim 1, in which each of the sealing members (2, 3) has a coupling section (5) loaded by a sealing spring (6) which blocks the sealing member (2, 3) in the uncoupled position and releases it in the coupled position, characterized in that the coupling section (5) has a port and guide member (41) as well as a fitting (40) which are guided in a fitting bore (31, 32) of the sealing member (2, 3), the port and guide member (41) lying in the fitting bore (31, 32) in the coupled position and so designed that the fluid can flow therethrough and the fitting (40) lies in the coupled position outside the fitting bore (31, 32) and, in the uncoupled position, lies tightly in the fitting bore (31, 32).

9. A quick-acting coupling according to claim 8 in which the two coupling sections (5) press against each other on coupling and are moved against the force of the sealing springs (6), characterized in that each of the sealing springs (6) is almost completely compressed by the coupling section (5) in the coupled position so that the coupling sections (5) are securely fixed in the coupled position against fluid pressure surges.

10. A quick-acting coupling according to claim 8, characterized in that the coupling section (5) is mushroom-shaped, that there is a stop (42) in each sealing member (2, 3) against which the underside (59) of the hat (39) of the mushroom-shaped coupling section (5) abuts on uncoupling, the upper side (60) of the hat (39) forming a support for one end of the sealing spring (6), a part (41) of the stem (40, 41) having at least one recess (56) for throughflow of the fluid and/or the edge of the hat of the mushroom-shaped coupling section (5) forming the port and guide member (41) guided in the fitting bore (31, 32) and the other part forming the fitting (40).

11. A quick-acting coupling according to claim 10, characterized in that the stem of the mushroom-shaped coupling section (5) is a cylindrical bolt, the port and guide member (41) of which facing away from the hat (39) has axial recesses (56) on the circumference, there being at least one throughflow space for the fluid in the area of the hat (39).

12. A quick-acting coupling according to claim 11, characterized in that the entire cross sectional area of the recesses on the stem is substantially the same as the entire cross sectional area of the throughflow space in the area of the hat.

13. A quick-acting coupling according to claim 10 characterized in that a coaxial second bore (35, 36) connects with the fitting bore (31, 32) and that the stop for the underside (59) of the hat (39) between the two bores (31, 32, 35, 36) is in the form of an annular shoulder (42), the port and guide member (41) extending in the coupled position into the second bore (35, 36).

14. A quick-acting coupling according to claim 13, characterized in that the hat (39) is moveable within the second bore (35, 36) and the coils of the sealing spring (6) take the form of a helical spring abutting against the wall of the second bore (35, 36) so as to reduce fluid flow resistance in the second bore (35, 36).

15. A quick-acting coupling according claim 8, characterized in that the port and guide member (41) in the coupled position extends beyond the fitting bore (31, 32), the two sealing members (2, 3) each having at least one annular projection (21, 22, 23) which fit into each other in a sealed manner in the coupled position and the axial length (a) of the contact surfaces of the annular projections (21, 22, 23) lying a sealed manner against each other is more than twice as long as the length (b) of the port and guide member (41) extending beyond the fitting bore (31, 32) in the coupled position so that no fluid can escape from the piping and/or sealing members (2, 3) whilst the sealing members (2, 3) are pulled apart and connected together.

* * * * *